United States Patent [19]

Gardner et al.

[11] 4,227,069
[45] Oct. 7, 1980

[54] HOT MELT DISPENSER

[75] Inventors: James J. Gardner; Hugh P. Koppehele, both of Hamilton, Ohio

[73] Assignee: Nordson Corporation, Amherst, Ohio

[21] Appl. No.: 898,481

[22] Filed: Apr. 20, 1978

Related U.S. Application Data

[63] Continuation-in-part of Ser. No. 755,974, Dec. 30, 1976, abandoned.

[51] Int. Cl.² ............................ B67D 5/62; H05B 3/78
[52] U.S. Cl. .................................... 219/421; 219/214; 219/296; 219/523; 219/530; 222/146 HE; 239/135
[58] Field of Search ............... 219/296, 297, 302, 316, 219/420–426, 523, 437, 530, 540, 214, 417; 222/146 R, 146 H, 146 HE; 239/133, 135, 128; 425/144

[56] References Cited

U.S. PATENT DOCUMENTS

| | | | |
|---|---|---|---|
| 449,035 | 3/1891 | Capek | 219/417 |
| 2,478,893 | 8/1949 | Brant | 219/421 X |
| 2,522,652 | 9/1950 | Von Haase | 219/214 |
| 3,282,469 | 11/1966 | Skonberg | 222/146 HE |
| 3,412,903 | 11/1968 | Van Riper et al. | 222/146 HE |
| 3,433,030 | 3/1969 | Jacobs | 219/201 X |
| 3,531,023 | 9/1970 | Mercer | 222/146 HE |
| 3,546,430 | 12/1970 | Kane | 219/316 |
| 3,758,003 | 9/1973 | Kautz et al. | 222/146 HE |
| 3,776,426 | 12/1973 | Newton | 222/146 HE |
| 3,876,105 | 4/1975 | Kelling | 219/421 X |
| 3,877,610 | 4/1975 | Dickey | 222/146 HE |
| 3,964,645 | 6/1976 | Scholl | 219/421 X |
| 3,976,229 | 8/1976 | Jackson | 222/146 HE |
| 3,982,669 | 9/1976 | Moore | 222/146 HE |
| 4,073,409 | 2/1978 | Gardener et al. | 222/146 HE |

*Primary Examiner*—A. Bartis
*Attorney, Agent, or Firm*—Wood, Herron & Evans

[57] ABSTRACT

A hot melt pumping and dispensing apparatus for heating and pumping a heat liquefiable product from a barrel includes a platen movable into the barrel and having a plurality non-perforated, sector-shaped cast heater segments, each provided with an electric heater, arranged in a circle on the lower face of the platen and having inner ends defining a central space at a common apex thereof. The segments are spaced from each other to define narrow radial passageways between adjacent segments opening into the central space for delivery of liquefied product thereinto. A cartridge-type pump carried by the platen communicates with the central space. The lower face of each heater segment is provided with depending heat conducting cylindrical projections which extend in advance of the segments into the product in the barrel to preheat and soften the product. The segments may each have a truncated inner end or may each be pointed and have a truncated upper portion spaced radially outwardly of the point for defining the central space.

5 Claims, 7 Drawing Figures

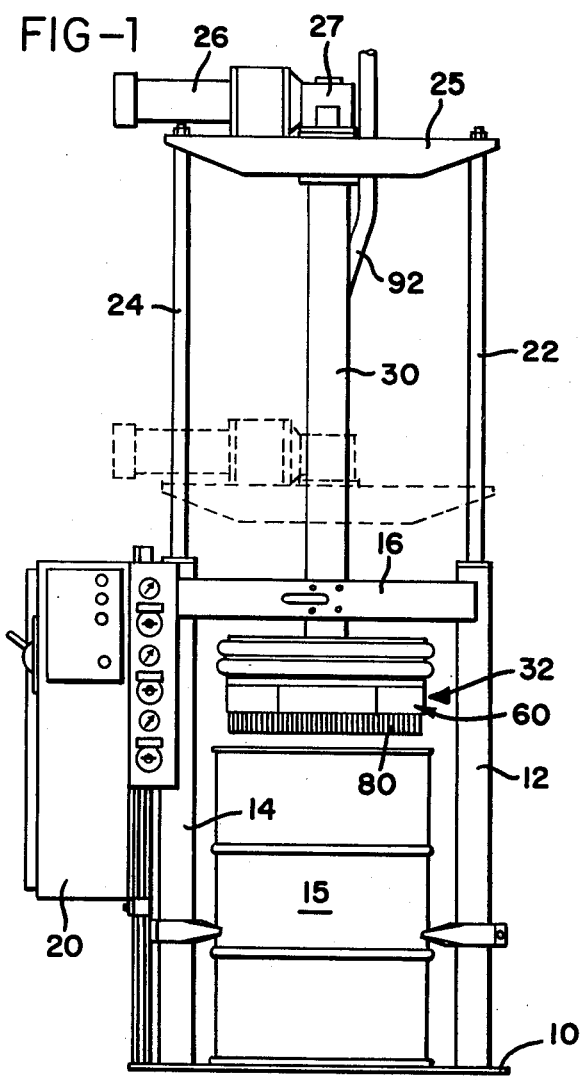
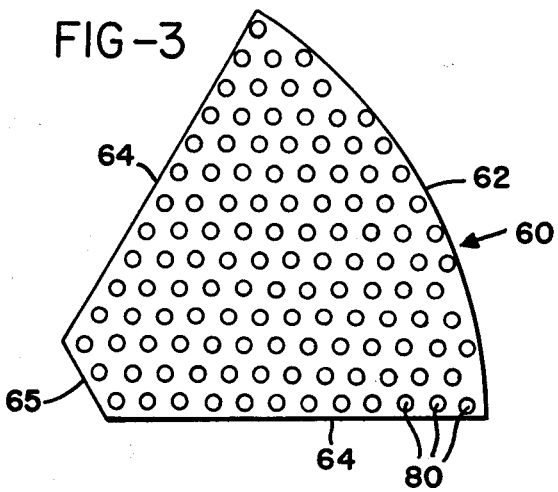
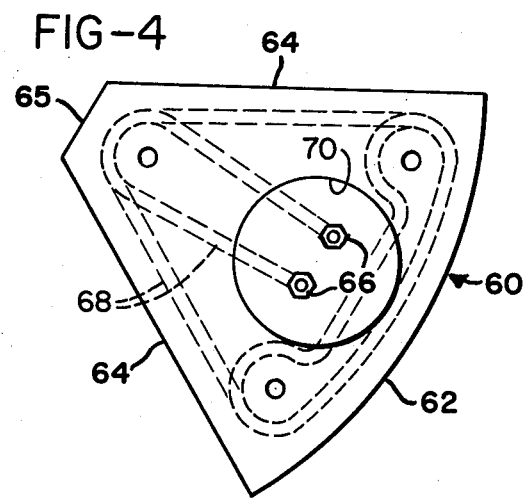
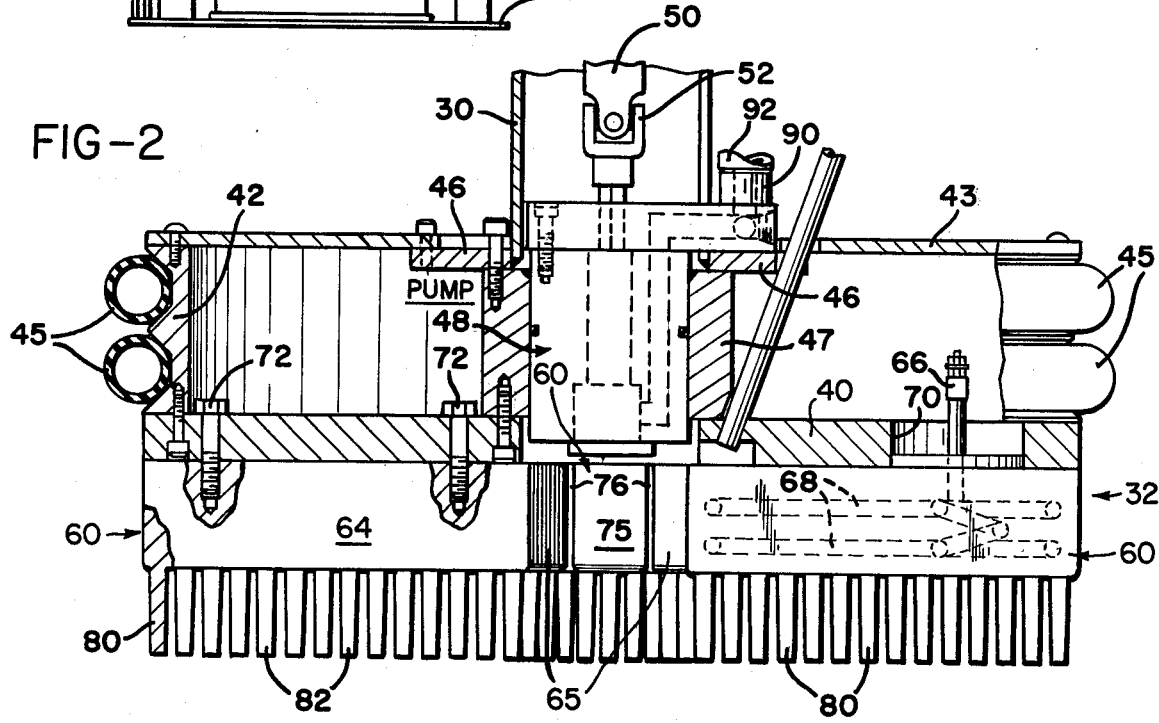

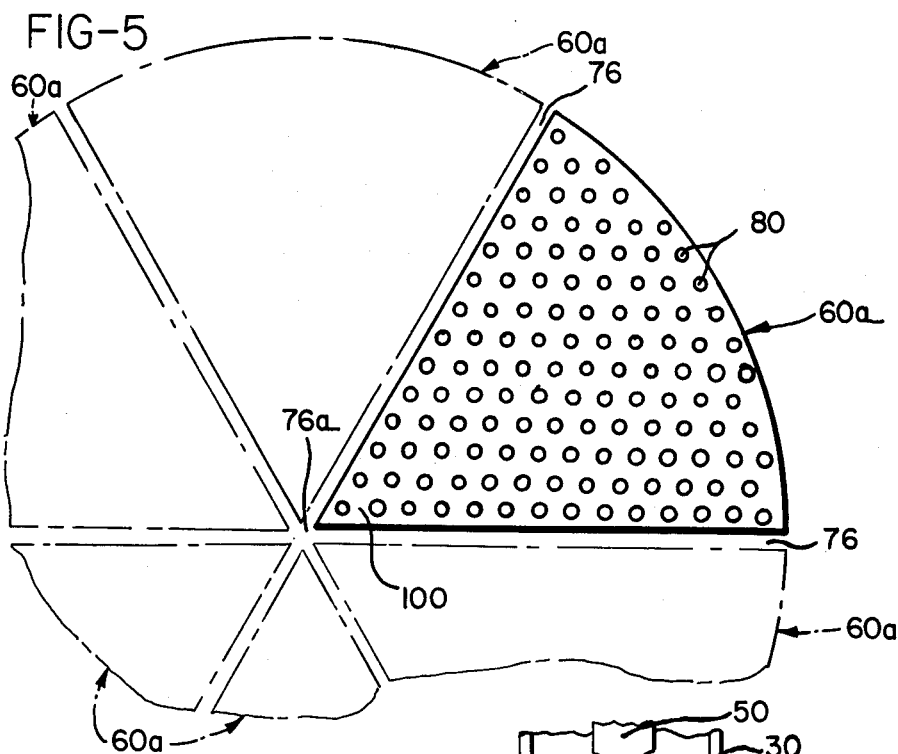
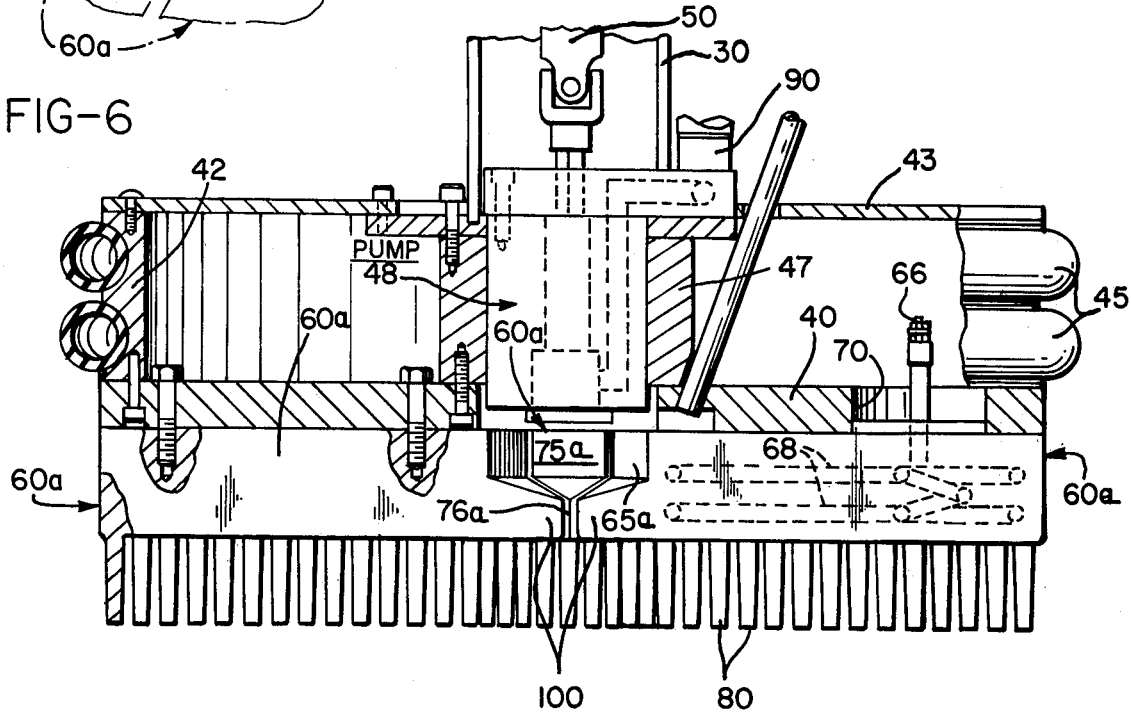
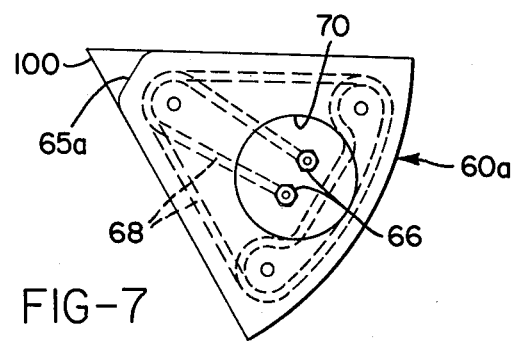

HOT MELT DISPENSER

RELATED APPLICATION

This application is a continuation-in-part application of U.S. Ser. No. 755,974 filed Dec. 30, 1976, now abandoned.

BACKGROUND OF THE INVENTION

This invention relates to the art of hot melt pumping and dispensing apparatus, and pertains more particularly to an improved heater construction for such apparatus.

The prior art describes a number of hot melt dispensers which liquefy and dispense plastic materials which are normally solid or semi-solid at room temperature, and which materials become sufficiently plastic or liquid at elevated temperatures to permit dispensing directly from the shipping container or barrel. Commonly, such devices include an arrangement for lowering a combined heating element and pump directly into the open end of the shipping container for liquefying or melting the plastic material in the region directly below a heated platen for delivery by pump of the heated and liquefied material to a remote location. Such apparatus is shown, for example, in the U.S. Pat. Nos. of Van Haase, 2,522,652 of 1960; Hooker, 3,031,106 of 1962, Weitzel, 3,113,705 of 1963; Skonberg, 3,282,469 of 1966; Van Riper, Jr., et al, 3,412,903 of 1968; and McCreary, 3,637,111 of 1972.

Commonly, the dispensing apparatus includes a heated follower plate assembly which supports a pair of gaskets about its periphery, which carries, supports or incorporates a pump, and which carries, supports or incorporates a heater or heater segments on the bottom thereof exposed directly to the plastic material within the container, for liquefying the plastic material within is exposed directly to the heater, and for delivery of such plastic material through suitable passageways to the inlet of a pump. Either a platform may be provided by means of which the container is elevated or a mechanism may be provided by means of which the plate assembly is lowered into the container.

Commonly, such heating assemblies are provided with heating elements which present flat heated surfaces to the plastic material to be melted. While such apparatus has proven to be highly useful with material which is readily elevated to a flowable temperature, and where the demand for such material is relatively low, such heating elements have proven to be less than fully effective when applied to material which requires a higher melt temperature or when applied to installations where greater flow rates are required, or both.

Hot melt materials which are dispensed by the apparatus of this invention are an extension of the thermoplastic family of products. Commonly, higher melt index polymers are being used in blends. These materials comprise a series of families including butyl rubber, meltable rubbers, and the "low end" of common polymers such as polyethylene, acrylics, polypropylene, polyesters, and polyamides. Melt temperatures can range anywhere from the ambient up through 500° F. or more, with the bulk of applications being in the 250° F. to 350° F. range. However, there are many materials which move more readily by the addition of temperature even though they, in themselves, are not considered in the hot melt family of products. In other words, warming the product decreases its viscosity and allows it to be handled more readily. A product which, as an example, would be impossible to pump at 60° F., may very well by the type of product that when elevated to the temperature of 90° F. or so would be a pumpable material.

Characteristics of the pumped material range from a sharp melting product through those products which essentially only change in viscosity having no sharply defined transition temperature between the "solid" and molten phases. Chemists blend in many types of additional compounds to provide tackiness, providing a series of compounds which are considered pressure sensitive. They behave much like the equivalent materials in the rubber based families which require the elimination of solvent for their inherent pressure sensitive characteristics.

Viscosities can range anywhere from light syrup through the butyl family which can be handled at temperatures which permit, for example, extruding a bead which retains its circular cross-section as it cools.

SUMMARY OF THE INVENTION

The invention of the present application is directed particularly to improved heater constructions, including a plurality of individual cast, direct-heated segments which are positioned on the support platen or plate generally in a circular arrangement, and which define a pump inlet opening at a common apex.

One of the difficulties in normally applying heat to hot melt materials is of applying heaters above the product, with the usual arrangements requiring the heat be transferred through a variety of surfaces into the final product to be heated. By using cast-in heaters formed in segments, it is possible to change any one of the segments in the event of a failure. Also, the radial gaps between the segments can be controlled to provide flow passageways for transferring material which is already molten into a centrally-located pump. Also, the relatively axially thick heater segments assures that the heat is transferred from the heater elements to the material, increasing the life of the electric elements.

Each of the cast heater segments is preferably formed with a plurality of depending, heat-conducting projections which terminate at a common plane. The projections precede the main heater body into the material and provide a greatly increased area for dissipation of heat, so that the material underlying the heater bodies is preheated and softened. The projections serve to remove heat from the body of the heaters directly into the material or product. The projections further define therebetween a multitude of flow passages which provide for the flow of melted plastic material inwardly into the pump inlet.

In the preferred embodiments, the projections are formed as solid, vertically-extending substantially cylindrical members, each of the same dimensions, and arranged in equally spaced relationship from each other on each of the heater segments. They are formed with axial lengths which substantially exceed their diameters, and are also formed as an integral portion of the main body of the heater.

It is accordingly an important object of the invention to provide a hot melt pumping and dispensing apparatus including an improved heater construction.

Another important object of the invention is to provide hot melt pumping apparatus in which a heater is formed as a plurality of arcuate segments arranged in a circle and defining at a common apex a heater inlet passage.

A further object of the invention is to provide a heater, as outlined above, formed with a plurality of depending heat conducting projections which extend downwardly from the heater body and into the plastic material in advance of the body, for preheating and softening hot melt material within a container or the like.

These and other objects and advantages of the invention will be apparent from the following description, the accompanying drawings, and the appended claims.

BRIEF DESCRIPTION OF THE DRAWINGS

FIG. 1 is an elevational view of hot melt pumping and dispensing apparatus in accordance with this invention;

FIG. 2 is an enlarged vertical cross section through a platen showing the heater elements in elevation, with a portion thereof being broken away;

FIG. 3 is a bottom plan view of one of the heater segments;

FIG. 4 is a top plan view thereof;

FIG. 5 is a partial bottom plan view of the platen showing a modified form of the heater elements; and FIG. 6 is a vertical section similar to FIG. 2 showing the heater segments of FIG. 5.

FIG. 7 is a top plan view of a modified form of heater segment shown in FIG. 5.

DESCRIPTION OF THE PREFERRED EMBODIMENTS

Referring first to FIG. 1, the improved hot melt dispensing apparatus according to this invention includes a base plate 10 on which are supported a plurality of uprights, including a pair of upright support cylinders 12 and 14. The base 10 supports a barrel 15 of hot melt material to be dispensed by the apparatus of this invention.

The cylinders 12 and 14 are supported at their upper ends at a transfer support 16. Also, a control box 20 may be supported on the base 10 and support 16 for including the electrical and temperature-monitoring controls of the dispensing apparatus.

A pair of cylinder rods 22 and 24 extend upwardly respectively from the cylinders 12 and 14. The rods are joined and connected at their tops by a crosshead 25. The crosshead 25 also supports a pump drive motor 26 and a right angle drive gear box 27.

The crosshead 25 further supports a depending tube 30. A follower plate assembly indicated generally at 32 in FIG. 1 is carried by the tube 30, and is shown in the raised or elevated position prior to entering the barrel 15. Air under pressure may be admitted into the cylinders 12 and 14 to cause the rods 22 and 24 to extend and lift the crosshead 25 and the associated structure supported thereon to an elevated or raised position, as shown in FIG. 1. Similarly, air under pressure may be applied to the opposite ends of the cylinders 12 and 14 to cause the follower plate assembly 32 to be lowered into the barrel with a predetermined force or pressure against material in the barrel 15.

Referring to FIG. 2, the follower plate assembly 32 is shown as including a generally cylindrical bottom plate 40 on which is mounted a cylindrical body 42, which supports a cover plate 43. The body 42 is formed with a pair of peripheral grooves which respectively support a pair of hollow elastomer seals 45. The seals 45 engage the inside walls of the barrel 15 and provide a fluid-tight seal therewith. The support tube 30 is joined to the assembly 32 by a flange 46 and an annular spacer 47. The spacer 47 preferably receives a gear-type positive displacement cartridge type pump 48. The pump 48 is directly driven by the motor 26 and the drive 27 through a drive shaft 50 within the tube 30, as coupled by a universal joint 52.

There are supported on the lower surface of the plate 40 a plurality of essentially identical sector-shaped heater segments 60 as shown in FIGS. 3 and 4. Each heater segment 60 is formed with a curved outer peripheral wall 62, generally radially extending sides 64 and a truncated apex 65. Each heater segment 60 is preferably formed of cast aluminum and incorporates a cast-in heating element 68 as shown in broken view in FIG. 2. The electrical terminals 66 extend upwardly through access openings 70 formed in the follower plate. Bolts 72 extend downwardly through the follower plate into the body of the heater segments 60 for securing the segments in underlying relation to the bottom plate 40.

The individual heater segments 60 are arranged side-by-side in a circle on the plate 40, and define at a common apex formed by the truncated surfaces 65 at a central pump inlet opening 75 as shown in FIG. 2. Narrow radial flow passages 76 are defined between the adjacent walls 64 of the heater segments. In the embodiment shown, six heater segments 60 are employed as subtending an approximate arc of 30°. However, it is within the scope of this invention to arrange the heater into a fewer or greater number of sector-shaped heaters.

The lower heat conducting surfaces of the heater segments 60 are preferably formed with a plurality of depending, integral heat conducting projections 80. In the embodiment shown, the projections 80 are all the same diameter, and are generally cylindrical in shape, but may be formed as tapered cones with about a 1½° taper wider at their bases when joined with the segments 60 than at their tips 82. The tips of the projections preferably terminate at a common plane and are arranged in a regular grid or pattern as shown in FIG. 3 to define therebetween a multitude of flow passages. The generally cylindrical pin-shaped projections provide a heating area which is greatly increased over the planar area which would otherwise be presented to the plastic material and may extend a depth of approximately 2", for example, below the surface of the heater body itself. The pins or projections 80 thus precede the main bodies of the segments 60 and extend into the plastic material in advance to preheat and soften the plastic material for flow therebetween and flow through the radial passages 76 into the central inlet space 75 and from there into the inlet of the pump 48. The pump outlet opens into a fitting 90 to which a tube 92 (FIG. 1) is attached for delivery of the hot melt material to a remote location.

The segmented heater construction of the present invention has been found substantially to increase the capacity of the dispensing apparatus. For example, when a follower plate assembly 32 of 22" in diameter is provided by this invention with 738 pins 2" long, a heating surface of approximately 2,400 square inches is formed. The employment of the pins provides a seven to eight times increase in effective area over that of a simple or flat annular heating plate of the same diameter. A 27,000 watt heater constructed according to this invention can provide a flow rate for example, of 10 gallons per minute. However, the flow rate is, itself, a function of many factors including the specific heat of the material and the ability of the material to conduct energy. Preferably, the projections 80 are each formed of the same diameter and are arranged in substantially equal spacing from each other and for an axial length which substantially exceeds their diameter.

While the preferred embodiments as shown and described herein incorporates a plurality of generally cylindrically shaped depending pins 82, it is to be understood that in the broader aspects of the invention, the pins may be eliminated and suitable heating channels or grooves formed in place thereof, or a flat lower surface may be provided for the segments 60. The individual segments 60 permit ease of maintenance by removal and replacement of any one segment which has become inoperative. Further, by controlling the arcuate widths of the segments, the capacity of the radial channels or passages 76 may be controlled or varied, and the depth of such passages also be varied, to accommodate a quantity of the liquefied material for delivery to the inlet of the pump 48. It will also be noted that the principal body of the heater segment 60 is relatively deep, as shown in FIG. 2, providing a mass of aluminum for conduction of heat from the heating element 68 for the protection of the heating element. The increased surface such as provided by the pins 82 assures constant direction of energy flow from the element into the underlying material within the barrel 15.

In the embodiments of this invention, the cartridge pump 48 may be constructed as shown in U.S. Pat. No. 4,073,409 issued Feb. 14, 1978 and assigned to the same assignee as this invention.

With respect to the embodiment shown in FIGS. 5 and 6, a somewhat altered form of the heater is shown. In some instances, it may be desirable to prevent any unmolten or unmelted material from being forced upwardly toward the inlet of the pump 48. Normally, there is sufficient dwell time for all of the material to be liquefied and delivered to the central opening 75 prior to the delivery of the pump. However, where high application rates are involved, accompanied by rapid downward movement of the platen, it is desirable to employ the heater segments shown in FIGS. 5 and 6, in which the pattern of pins is extended completely to the apex of the segments. In this embodiment, like parts are described with like reference numerals, corresponding to those used in the embodiment described in connection with FIGS. 2–4.

The embodiment shown in FIGS. 5 and 6 employs cast, sector-shaped heater segments similar to those provided in the preceding embodiment, in that they are formed of heat conductive aluminum material, and have electric heater elements cast into a non-perforated heater body. However, the heater segments 60a of FIGS. 5 and 6 differ from the heater segments 60 in that the pattern of pins 80 is extended to an apex or to a point, as illustrated generally at 100 in FIG. 5. This apex forms a radially inner portion on each heater segment.

When viewed in elevation as shown in FIG. 6, only the upper or inner portion of the segments is truncated or relieved to define the partial surface 65a so that a central open region 75a is established radially within the heater segments 60a and open to the radial passages 76 between the adjacent heater segments. The surfaces 65a form axially inner surfaces spaced radially outwardly of apex or point 100. The extended portions 100 form an integral part of the heater segments 60, and terminate at a generally common apex, as shown in FIG. 5, and prevent the pump inlet from directly receiving any unmolten or partially liquefied material. For the most part, the liquefied material is delivered to the central open region 75a by radial inward flow directly through the passages 76, but some may flow axially through the central common or intersecting region 76a of the passages 76. Thus, in the embodiment of FIGS. 5 and 6, the generally sector-shaped individual heaters 65a include the integral depending heat conducting projections or pins 80, as in the preceding embodiment, which extend downwardly and terminate at a common plane. The radial flow passages 76 between individual heater segments 60a open into the space 75a below the plate 40 into which molten material is collected for delivery to the pump.

While the forms of apparatus herein described constitute preferred embodiments of this invention, it is to be understood that the invention is not limited to these precise forms of apparatus, and that changes may be made therein without departing from the scope of the invention.

What is claimed is:

1. A heater arrangement for a hot melt dispenser having a bottom circular support plate and pump means positioned centrally of said plate, the improvement comprising a plurality of generally sector-shaped cast heater segments each being provided with heating means and arranged in a circle on the lower face of said plate and being spaced from each other defining generally radially-extending, intersecting flow passages between adjacent said heater segments, each of said heater segments having a lower radially inner portion terminating generally at a point adjacent the center of the plate and having an upper portion truncated outwardly of the point to form an axially inner surface spaced radially outwardly of said point to define a central common open space therebetween into which liquefied material is connected, said pump means opening into said common space for receipt of liquefied material therefrom, and means on the lower surface of each of said segments forming a plurality of depending spaced projections formed integrally of said segments and having lower ends which terminate generally in a common plane.

2. In hot melt pumping and dispensing apparatus in which a platen carrying a pump and a plastic material heater is arranged to be lowered into a barrel of hot melt plastic material for melting and dispensing the same from the barrel, the improvement in heater construction comprising a plurality of individual sector-shaped heater segments arranged in a circle on the lower face of said platen and defining a central space at a common apex thereof in communication with said pump, each of said heater segments having a non-perforated heater body of heat conducting material, a heater element embedded in said body, and a plurality of integral depending heat conducting projections formed integrally with the lower face of said body and extending downwardly therefrom and terminating substantially at a common plane, said projections being proportioned to extend into said material in advance of said body to preheat and soften said material for liquefaction by said body, and said segments being spaced from each other to define radial flow passages between adjacent said segments and opening into said space for delivery of heated material thereto.

3. The apparatus of claim 2 in which said projections define solid vertically extending cylindrical members each substantially of the same diameter and arranged on said body in substantially equal spacing from each other and having an axial length which substantially exceeds their diameter.

4. The apparatus of claim 2 in which said segments have inner ends which are truncated and define an open region leading from below said heater segments directly to said central space.

5. The apparatus of claim 2 in which each of said segments has a pointed inner end formed in the lower portion of said segment, and having a truncated upper portion spaced radially outwardly of said point defining the central space at the apex, said pointed inner ends substantially closing said space and inhibiting direct flow of material into said space so that the major portion of the liquefied material flows into said space through said radial flow passages.

* * * * *